United States Patent
Lenner et al.

(10) Patent No.: US 11,874,254 B2
(45) Date of Patent: Jan. 16, 2024

(54) INTEGRITY DETECTION SYSTEM FOR AN ULTRASOUND TRANSDUCER

(71) Applicant: ABB Schweiz AG, Baden (CH)

(72) Inventors: Miklos Lenner, Daettwil (CH); Frank Kassubek, Rheinfelden (DE); Stefano Marano, Zurich (CH); Gerrit Held, Oberrohrdorf (CH)

(73) Assignee: ABB Schweiz AG, Baden (CH)

( * ) Notice: Subject to any disclaimer, the term of this patent is extended or adjusted under 35 U.S.C. 154(b) by 243 days.

(21) Appl. No.: 17/092,346

(22) Filed: Nov. 9, 2020

(65) Prior Publication Data

US 2021/0140923 A1    May 13, 2021

(30) Foreign Application Priority Data

Nov. 13, 2019   (EP) .................................. 19208991

(51) Int. Cl.
  *G01N 29/04*   (2006.01)
  *G01N 29/07*   (2006.01)
  (Continued)

(52) U.S. Cl.
  CPC ........... *G01N 29/041* (2013.01); *G01N 29/07* (2013.01); *G01N 29/11* (2013.01); *G01N 29/28* (2013.01);
  (Continued)

(58) Field of Classification Search
  CPC ...... G01N 29/041; G01N 29/07; G01N 29/28; G01N 29/11; G01N 29/4427;
  (Continued)

(56) References Cited

U.S. PATENT DOCUMENTS 3,552,191 A     1/1971   Heseding
3,916,699 A *   11/1975  Moran .................. G01N 29/14
                                            73/592
(Continued)

FOREIGN PATENT DOCUMENTS

DE    19957905 A1    5/2001
EP     3115755 A1    1/2017
(Continued)

OTHER PUBLICATIONS

J. M. Allin, "Disbond detection in adhesive joints using low-frequency ultrasound", PhD. Thesis, submitted at the Department of Mechanical Engineering, Imperial College of Science Technology and Medicine (2002).

*Primary Examiner* — Helen C Kwok
(74) *Attorney, Agent, or Firm* — Leydig, Voit & Mayer, Ltd.

(57) ABSTRACT

A signal processing unit configured to: cause a first ultrasound emitter, when attached to a wall of a vessel, to emit a first ultrasound test signal; receive, from at least one ultrasound receiver, when attached to the wall of the vessel, the first ultrasound test signal; detect a time of flight of the received first ultrasound test signal; and determine that an acoustic coupling of the first ultrasound emitter and a first ultrasound receiver of the at least one ultrasound receiver to the wall of the vessel is intact if the detected time of flight corresponds to a length of a path in the wall of the vessel from the first ultrasound emitter to the at least one ultrasound receiver.

10 Claims, 5 Drawing Sheets

(51) Int. Cl.
  *G01N 29/28* (2006.01)
  *G01N 29/44* (2006.01)
  *G01N 29/30* (2006.01)
  *G01N 29/11* (2006.01)
  *G01N 29/46* (2006.01)
(52) U.S. Cl.
  CPC .......... *G01N 29/30* (2013.01); *G01N 29/4427* (2013.01); *G01N 29/4436* (2013.01); *G01N 29/4463* (2013.01); *G01N 29/46* (2013.01); *G01N 2291/044* (2013.01)
(58) Field of Classification Search
  CPC ........... G01N 29/4436; G01N 29/4463; G01N 29/46; G01N 29/30; G01N 2291/044; G01N 2291/2634; G01N 2291/011; G01N 2291/105; G01S 7/52004
  See application file for complete search history.

(56) References Cited

U.S. PATENT DOCUMENTS

| | | | | |
|---|---|---|---|---|
| 4,669,310 A | * | 6/1987 | Lester | G01N 29/07 73/1.81 |
| 4,896,303 A | * | 1/1990 | Leslie | G01V 1/50 702/6 |
| 5,062,300 A | * | 11/1991 | Vallee | G01N 29/265 73/628 |
| 5,517,994 A | | 5/1996 | Burke et al. | |
| 6,035,717 A | * | 3/2000 | Carodiskey | G01B 17/025 73/600 |
| 6,363,788 B1 | | 4/2002 | Gorman et al. | |
| 2002/0134159 A1 | * | 9/2002 | He | G01N 29/46 73/579 |
| 2010/0241034 A1 | | 9/2010 | Little | |
| 2012/0055253 A1 | * | 3/2012 | Sinha | G01N 29/222 73/622 |
| 2014/0041442 A1 | * | 2/2014 | Heinrich | G01N 29/024 73/61.79 |
| 2016/0290972 A1 | * | 10/2016 | Lepage | G01N 29/226 |
| 2017/0010144 A1 | * | 1/2017 | Lenner | G01N 29/024 |
| 2017/0284859 A1 | * | 10/2017 | Bauer | G01N 29/4472 |
| 2018/0306628 A1 | | 10/2018 | Parrott et al. | |
| 2021/0190572 A1 | * | 6/2021 | Lenner | G01N 29/221 |
| 2021/0205772 A1 | * | 7/2021 | Bernhard | G01N 29/44 |

FOREIGN PATENT DOCUMENTS

| | | |
|---|---|---|
| GB | 2284053 B | 6/1997 |
| JP | H 10104207 A | 4/1998 |

* cited by examiner

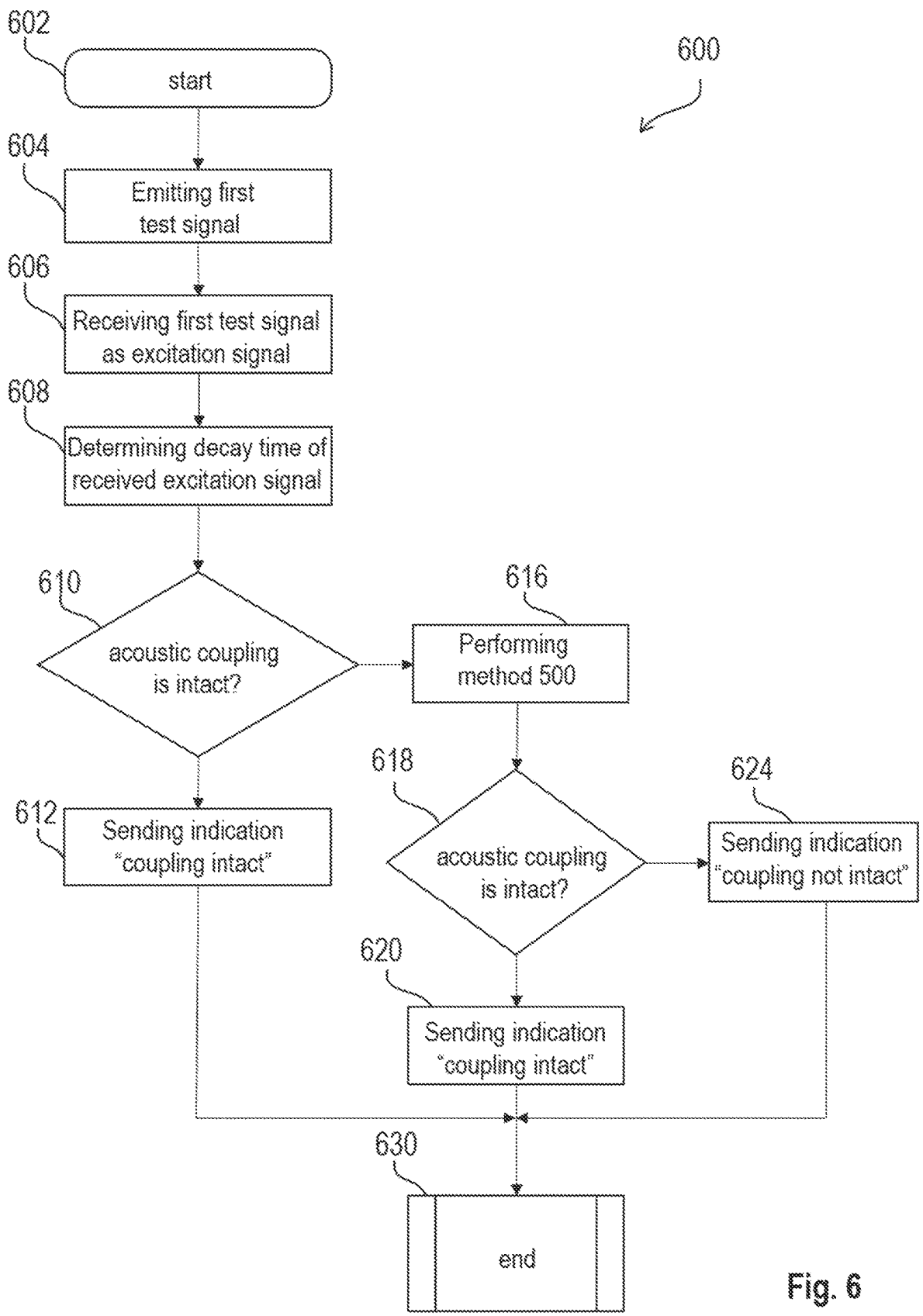

INTEGRITY DETECTION SYSTEM FOR AN ULTRASOUND TRANSDUCER

CROSS-REFERENCE TO PRIOR APPLICATION

Priority is claimed to European Patent Application No. EP 19 208 991.0, filed on Nov. 13, 2019, the entire disclosure of which is hereby incorporated by reference herein.

FIELD

The present invention relates to an integrity detection system for detecting the integrity status of an acoustic coupling between an ultrasound transducer and a wall of a vessel, a method for detecting the integrity of an acoustic coupling, a signal processing unit, a program element, and a computer readable medium

BACKGROUND

Non-invasive ultrasonic sensors are usually mounted outside a vessel and generate acoustic waves, which penetrate through the wall. The propagation of the waves is influenced by the properties of the vessel content, including, for example, level or flow. Thus, characterization of the waves outside the vessel after propagation allows the measurement of content properties. For this, efficient, stable and reliable coupling of the acoustic waves in and out of the vessel is of key importance—especially for mobile or diagnostic applications.

SUMMARY

In an embodiment, the present invention provides a signal processing unit configured to: cause a first ultrasound emitter, when attached to a wall of a vessel, to emit a first ultrasound test signal; receive, from at least one ultrasound receiver, when attached to the wall of the vessel, the first ultrasound test signal; detect a time of flight of the received first ultrasound test signal; and determine that an acoustic coupling of the first ultrasound emitter and a first ultrasound receiver of the at least one ultrasound receiver to the wall of the vessel is intact if the detected time of flight corresponds to a length of a path in the wall of the vessel from the first ultrasound emitter to the at least one ultrasound receiver.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following:

FIG. 6 shows a further flow diagram of a method according to an example.

DETAILED DESCRIPTION

Figure 1:
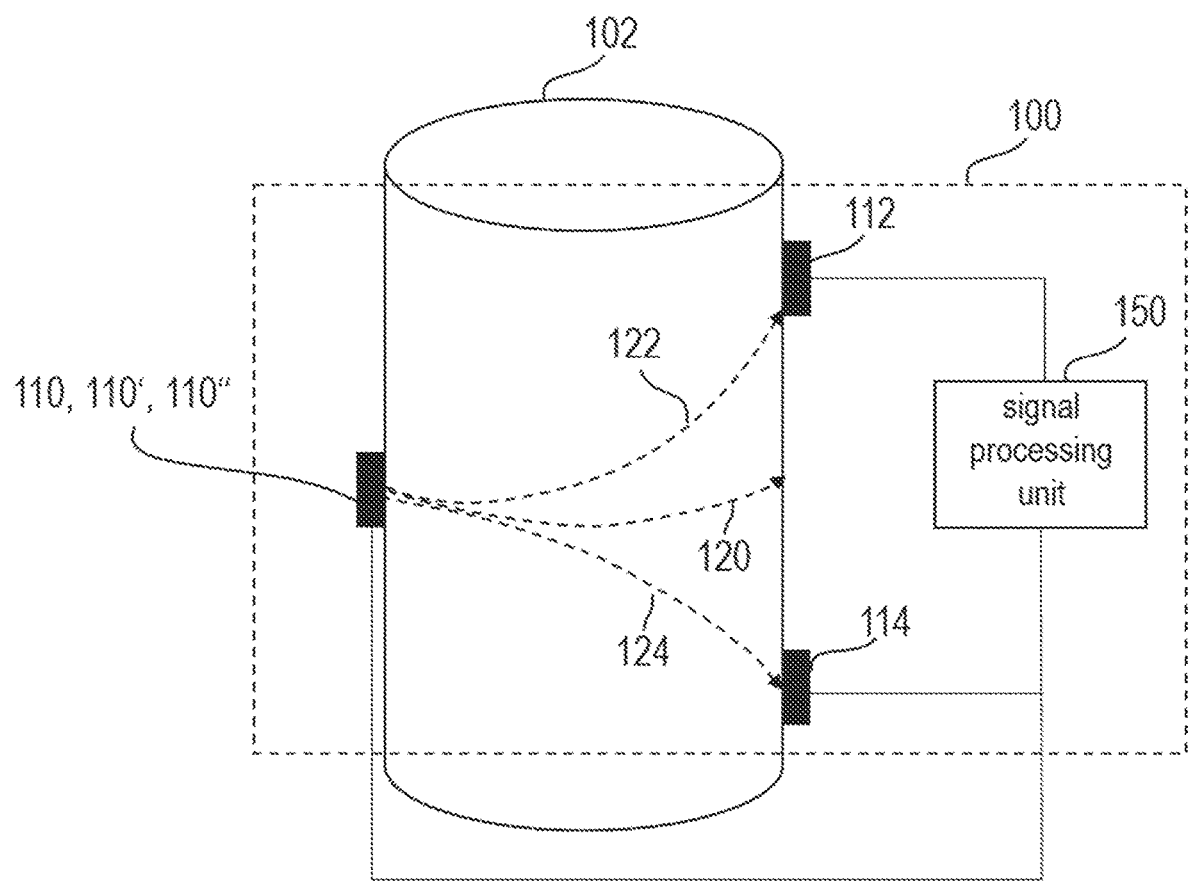
FIG. 1 shows a diagram of a first example of an integrity detection system for detecting an integrity status of an acoustic coupling.

In an embodiment, the present invention detects the integrity status of an ultrasound transducer coupling of an ultrasound transducer attached to a wall of a vessel.

The described embodiments similarly pertain to the integrity detection system for detecting the integrity status of an acoustic coupling between an ultrasound transducer and a wall of a vessel, the method for detecting the integrity status, the signal processing unit, the program element, and the computer readable medium. Synergetic effects may arise from different combinations of the embodiments although they might not be described in detail.

Further on, it shall be noted that all embodiments of the present invention concerning a method, might be carried out with the order of the steps as described, nevertheless this has not to be the only and essential order of the steps of the method. The herein presented methods can be carried out with another order of the disclosed steps without departing from the respective method embodiment, unless explicitly mentioned to the contrary hereinafter.

Technical terms are used by their common sense. If a specific meaning is conveyed to certain terms, definitions of terms will be given in the following in the context of which the terms are used.

According to a first aspect, a signal processing unit is provided, which is configured to cause a first ultrasound emitter, when attached to a wall of a vessel, to emit a first ultrasound test signal, to receive, from at least one ultrasound receiver, when attached to the wall of the vessel, the first ultrasound test signal, to detect the time of flight of the received first ultrasound test signal, and to determine that the acoustic coupling of the first ultrasound emitter and the at least one ultrasound receiver to the wall of the vessel is intact, if the detected time of flight corresponds to the length of a path in the wall of the vessel from the first ultrasound emitter to the at least one ultrasound receiver.

According to a second aspect, an integrity detection system for detecting an integrity status of an acoustic coupling between an ultrasound transducer and a wall of a vessel is provided. The integrity detection system comprises a first ultrasound transducer, configured for being attached to the wall of the vessel and a signal processing unit. The first ultrasound transducer comprises a first ultrasound emitter and a first ultrasound receiver, configured for being attached to the wall of the vessel. The first ultrasound emitter is configured to emit a first ultrasound test signal. The at least one ultrasound receiver is configured to receive the first ultrasound test signal, and to transmit the received first ultrasound test signal or a signal corresponding to the received second ultrasound test signal, respectively, to the signal processing unit. The signal processing unit is configured to detect a first time of flight of the received first ultrasound test signal and to determine that the acoustic coupling between the first ultrasound emitter and the wall of the vessel is intact, if the detected first time of flight corresponds to the length of the path in the wall of the vessel from the first ultrasound emitter to the at least one ultrasound receiver.

That is, there may be one emitter and additionally one or more ultrasound receivers, which receive the first test signal emitted by the first ultrasound emitter. The receivers transmit the first test signal to the signal processing unit where the signal is analyzed for significances as, for example, peaks that are characteristic for the covered path. If the second test signal is not detected, the integrity is not given. That is, the contact for introducing the ultrasound energy into the wall and into the vessel, is not present. By arranging more than one receiver, redundancy is provided, so that a decision whether the integrity is given or not may be made according to a policy regarding the amount of detected signals. Furthermore, shorter paths can be realized, which may be necessary, if the properties of the vessel wall do not allow a propagation of the sound waves for a long path as, for example, around the vessel for a complete round. In addition, variations of the pulse propagation time over longer periods of measurement time allows the detection of transducer misplacements.

The first test signal may be a dedicated test signal used only for the tests as described in this disclosure, or it may be emitted and used for a regular ultrasound measurement. In any case, the test signal is received and analyzed for an integrity check.

According to an embodiment, one of the at least one ultrasound receivers is the first ultrasound receiver of the first transducer.

Taking as an example a cylindrical vessel, in case of proper acoustic contact the sound pulse is expected to make one or several round trips along the perimeter of vessel and couple back in the transducer. The time of flight, or equivalently, the expected time of arrival (ToA) can be estimated from the circumference of the vessel and the speed of sound in the wall. Alternatively, a reference measurement may be performed, for example after a successful installation, to obtain the time of flight of one round trip. In case the acoustic contact is lost, no signals can be detected around the expected ToA, or with the expected time of flight, respectively. The integrity detection system thus allows for detecting the integrity by checking, whether an emitted ultrasound signal is arriving after travelling circumferential around the vessel wall. The length of the path may comprise one round trip or several round trips around the vessel. In this example, the vessel is supposed to be cylindrical. However, the vessel may have another geometrical shape, where the signal may be reflected at the wall, edges, etc.

The term "first signal" is used here for a set of single signals from the first ultrasound transducer, wherein each of the single signals may be emitted with a different mode. For that, the transducer may be equipped with one or several emitter elements that can be operated at different frequencies, allowing the generation of different acoustic modes in the wall. The modes of the waves include, e.g. Lamb-, Rayleigh- or Scholte-waves.

The term "ultrasound transducer" is used in this disclosure as an ultrasound device that includes a receive element ("receiver") and an emit element ("element"). An "ultrasound receiver" may be a either integrated in an ultrasound transducer as, for example, the first ultrasound transducer, or a ultrasound device which is receiving only.

According to an embodiment, the integrity detection system comprises a further ultrasound transducer configured to emit a second ultrasound test signal in the wall of the vessel along a path to the first ultrasound receiver and along a path to the further ultrasound transducer. The first ultrasound receiver and the further ultrasound transducer are configured to receive the second ultrasound test signal and to transmit the received second ultrasound test signal or a signal corresponding to the additionally received second ultrasound test signal, respectively, to the signal processing unit. The signal processing unit is further configured to detect second times of flight of the received second ultrasound test signal and to determine that the acoustic coupling of the first ultrasound transducer and the further ultrasound transducer is intact, if the detected second times of flight correspond to the corresponding lengths of the first and the second paths of the second signal. The second signal may be emitted independently, especially with respect to the emission time, from the second ultrasound signal. It is noted again, that the time of flight is equivalent to an expected ToA, as known to a skilled person.

According to this embodiment, one or several transducers capable of emitting and receiving test signals are attached to the vessel wall. Any emit-receive configuration between the transducers is possible, allowing for further redundancy. Especially, it may happen, that the transducers aimed at testing the integrity of the acoustic coupling of the first transducer, have an insufficient contact for emitting or receiving the test signal. An arrangement with one or several transducers, each of which emits and receives a test signal, is capable to minimize the risk of false decisions.

According to a further embodiment, the at least one ultrasound receiver is further configured to measure an excitation signal of the first ultrasound test signal, and to transmit the received excitation signal to the signal processing unit. The signal processing unit is further configured to receive the excitation signal from the at least one ultrasound receiver, to determine the decay time of the received excitation signal, and to determine that the acoustic coupling of the first ultrasound emitter and the at least one ultrasound receiver is intact, if the decay time is less than a predetermined threshold. The signal processing unit is further configured to detect the first time of flight, and to determine that the acoustic coupling between the first ultrasound emitter and the wall of the vessel is intact based on the first time of flight, if the signal processing unit has determined, that the acoustic coupling of the first ultrasound emitter and the at least one ultrasound receiver is not intact.

In other words, two different tests are performed. Since the failing of the first test is not yet indicating, that the coupling is not intact, the second test is performed. The second test may also be performed stand-alone, however, the first test is the easier to perform, and there is a chance that the second test might be omitted (in case the first test passes).

The first signal for (i) the excitation measurement and for (ii) the measurement of the time of flight may be the same emitted signal, or two subsequent signals, where the order in which these signals are emitted, may be first (i) and thereafter (ii) or reverse. Preferably, the signal (ii) is emitted only if the integrity check based on the excitation failed.

According to an embodiment, the excitation signal is a signal generated by an application of an excitation voltage of the piezo for the first ultrasound test signal.

The received excitation signal decreases in terms of amplitude as, for example, voltage or signal-to-noise ratio, with time in/after the excitation phase. The term "decay time" relates to the time from a starting time, for example, when the excitation of the piezo is started to the point of time, when, e.g., a pre-defined voltage or signal-to-noise ratio is reached during the de-excitation phase. In an exponential decrease, the decay time may be characterized by the time parameter of the exponential curve, which may also be designated as "decay rate".

The acoustic excitation process includes applying a voltage of several Volts at a certain operating frequency to the piezo, which then begins to oscillate with the operating frequency and emits an ultrasound signal. A couplant between the piezo and the vessel wall improves significantly the energy transfer from the piezo to the vessel wall or through the medium into the medium. Similarly, the energy transfer into the medium is improved if the inner vessel wall is wet. Therefore, depending on the contact at the outer side and the wetting of the inner side, the energy is reflected more or less, which results in the described signal. If most of the energy is reflected due to an insufficient contact or wetting, the decay time is significantly longer than otherwise.

Indeed, there is an overlapping of the excitation and reflecting signal. The decay of the signal including the echo signal is regarded as being a part of the acoustic excitation process in this disclosure. Therefore, the term "excitation signal" comprises also the echo signal.

The decay time may be compared to a factory-calibrated value. As a possible implementation, factory-calibrated waveform templates that are representative for the acoustically terminated and unterminated transducer can be stored in the signal processing unit, which are subtracted from or cross-correlated with the measured waveform for comparison. "Acoustical terminated" means that the soundwaves are absorbed at the termination, so that there are no reflections back to the piezo, resulting in a fast ring down time, contrary to the unterminated case.

The system therefore allows an online diagnosis of the integrity of the acoustic coupling for ultrasonic sensors by measuring the decay time or decay rate, respectively, of the acoustic excitation signal or further comparison methods, and the presence of acoustic signals that propagate along the circumference of a vessel. Besides decay time and rate, other quantities that characterize the change of the excitation signal can be similarly used, some of which are described below. A single transducer with a single excitation element is suitable to perform the integrity check, even during normal transducer operation, for example, during a non-invasive level or flow measurement, and provides continuous validity information on the measured data. This self-diagnostic feature improves sensor reliability and enables condition monitoring, which is a key function of smart digital sensors.

According to a further embodiment, the excitation signal transmitted to the signal processing unit is a raw signal, and the signal processing unit is configured to pre-process the raw signal by applying a Hilbert transform and/or frequency filtering. As known to a skilled person, a raw signal is the analog signal as received, a suitably amplified (or electrically pre-processed, e.g. using analog filters) raw signal, or more sophisticated, the digitally sampled signal.

According to a further embodiment, the signal processing unit is further configured to subtract the raw signal or the pre-processed signal from factory-calibrated waveform templates and/or to cross-correlate the raw signal with factory-calibrated waveform templates, wherein the factory-calibrated waveform templates are representative for an acoustically terminated and an acoustically unterminated transducer.

The signal processing unit may be further configured to determine, whether the acoustic coupling of the first ultrasound transducer is intact, based on the subtraction and/or the cross-correlation.

The factory-calibrated waveform templates may be stored in a memory of the signal processing unit. The templates may be stored as samples or processed samples depending on the type of comparison to be performed with the measured signal.

It is known to a skilled person, that for subtraction and cross-correlation a time alignment or a time-shift, resp., of the reference signal with respect to the measured raw signal is necessary.

According to a further embodiment, the threshold used to differentiate between intact and defective acoustic coupling is a signal-to-noise-ratio or a value based on the output of an artificial intelligence algorithm or a pattern recognition algorithm. For example, a reference-signal-to-noise-ratio may be pre-defined to which the measured signal-to-noise-ratio is compared.

According to a further embodiment, the signal processing unit is further configured to compare an amplitude, a power spectrum, a spectral and/or a temporal phase of the received excitation signal with the waveform templates. Thus, different further characteristics of the sound wave may be used for the comparison of the reference waveforms with the measured waveform of the excitation signal.

According to a further aspect, a method for detecting an integrity status of an acoustic coupling between an ultrasound transducer and a wall of a vessel is provided. The method comprises the following steps:

In a first step, a first ultrasound test signal is emitted by a first ultrasound emitter, wherein the first ultrasound emitter is attached to the wall of the vessel. In a next step, the first ultrasound test signal is received by at least one ultrasound receiver and transmitted to the signal processing unit, wherein the at least one ultrasound receiver is attached to the wall of the vessel. In a further step, a time of flight of the received first ultrasound test signal is detected by the signal processing unit. In a further step, it is determined by the signal processing unit that the acoustic coupling of the first ultrasound emitter and the first ultrasound receiver to the wall of the vessel is intact, if the detected time of flight corresponds to the length of a path in the wall of the vessel from the first ultrasound emitter to the at least one ultrasound receiver.

The steps described in the method may also be part of a more extensive method corresponding to the above description of the system, in which first the decay time of the excitation signal is analyzed, and, if the integrity could not be determined by the analysis, the steps described above may be performed as a second check.

Therefore, according to an embodiment, the method comprises further the following steps:

Measuring an excitation signal of the first ultrasound test signal, and transmitting the measured excitation signal to the signal processing unit. Determining, by the signal processing unit, the decay time of the measured excitation signal. determining, by the signal processing unit, that the acoustic coupling of the first ultrasound emitter and the at least one ultrasound receiver is intact, if the decay time is less than a pre-determined threshold, and detecting the first time of flight and determining that the acoustic coupling between the first ultrasound emitter and the wall of the vessel is intact based on the first time of flight, if the signal processing unit has determined, that the acoustic coupling of the first ultrasound emitter and the at least one ultrasound receiver is not intact.

Thus, a method for monitoring the integrity of acoustic coupling of ultrasonic transducers is proposed, which may comprise one or two parts. E.g., in the first part, the decay rate of an acoustic excitation pulse is measured at the operational frequency. If the decay time is comparable to that corresponding to the acoustically terminated transducer, the acoustic contact is considered to be present. If the decay time is longer, in the second part of the method, a second measurement may be performed. The second part of the method may be performed as stand-alone-test, i.e., without executing the first part.

Here, specific acoustic modes are launched that are propagating in the vessel wall and propagate along a path such that the acoustic signal is detected by the same transducer as the corresponding emitting transducer. If the pulse(s) is (are) present at the expected time(s), the acoustic contact is considered to be appropriate. The expected pulse propagation times can be estimated from the known speed of sound for the corresponding acoustic modes and the length of the propagation path. In case the pulse is absent, the acoustic contact is lost and a warning information may be generated for the user or the measurement may be marked as invalid.

The signal processing unit may comprise circuits without programmable logics or may be or comprise a micro controller, a field programmable gate array (FPGA), an ASIC, a Complex Programmable Logic Devices (CPLD), or any other programmable logic devices known to person skilled in the art. The signal processing unit may further comprise communication devices for receiving data from the sensors by wire or over the air, for sending signals to the sensors, and optionally for communicating with network devices. Furthermore, the signal processing unit may comprise a storage for storing code and data, as for example the soundwave templates of a terminated and an unterminated transducer. The signal processing unit may be a single device inside an enclosure or a logical device consisting of several locally distributed hardware devices.

According to a further aspect, a program element is provided, which when being executed on a processor of the signal processing unit, controls an integrity detection system to perform the steps of the method.

The computer program element may be part of a computer program, but it can also be an entire program by itself. For example the computer program element may be used to update an already existing computer program to get to the present invention.

According to a further aspect, a computer readable medium is provided, on which a program element is stored.

The computer readable medium may be seen as a storage medium, such as for example, a USB stick, a CD, a DVD, a data storage device, a hard disk, or any other medium on which a program element as described above can be stored.

These and other features, aspects and advantages of the present invention will become better understood with reference to the accompanying figures and the following description.

Figure 4A:
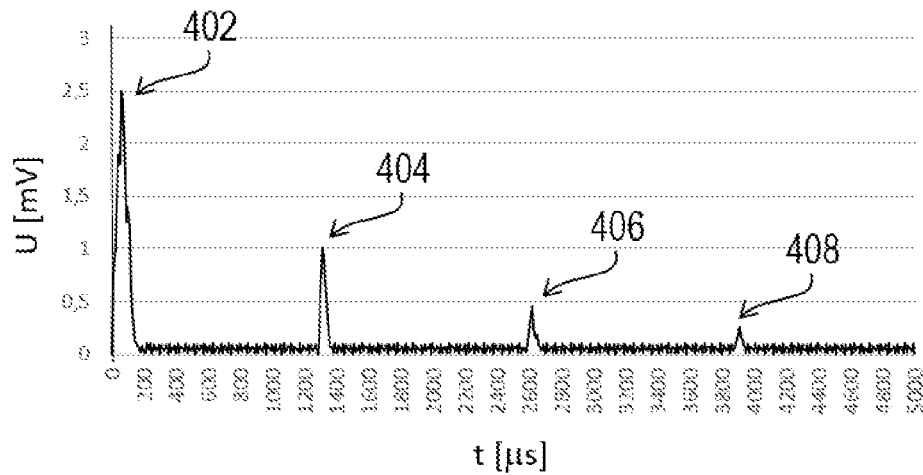
FIG. 4a shows an exemplary graphic of a data row with round trip peaks.

FIG. 1 shows a diagram of a first example of an integrity detection system 100 for detecting the integrity status of an acoustic coupling between an ultrasound transducer 110 and a wall of a vessel 102. Transducer 110 comprises an emitter 110' and a receiver 110", and is therefore a transducer for emitting and receiving ultrasound signals, whilst devices 112 and 114 are ultrasound receivers. Physically, the emitter 110' and the receiver 110" can be the same component, i.e. the same piezo is used and switched from emitter to receiver. This is often the best solution, as then the receiving piezo has then exactly the same properties, e.g. eigenfrequency. Transducer 110 emits ultrasound signals using different acoustic modes, resulting in propagation paths 122 inside the wall of the vessel 102 from the transducer 110 to receiver 112, and similarly, path 124 to receiver 114 and 120 which runs around the vessel 102 so that the transducer 110 receives the signal emitted by itself. If the length of the paths and the velocity of sound inside the wall of the vessel 102 are known, the expected time of flight can be calculated and compared to the measured time difference between emitting and receiving. Further indicators may be used without measuring the time of flight. For example, if a signal is detected at receivers 112 and 114 at—depending on the geometry—the same time, an intact coupling can be assumed. Furthermore, a regular repetition of a received signal, i.e., significant peaks of the amplitude as shown in FIG. 4a, corresponding to the round-trips of the test signal around the vessel 102 indicate a proper connection.

Figure 2:
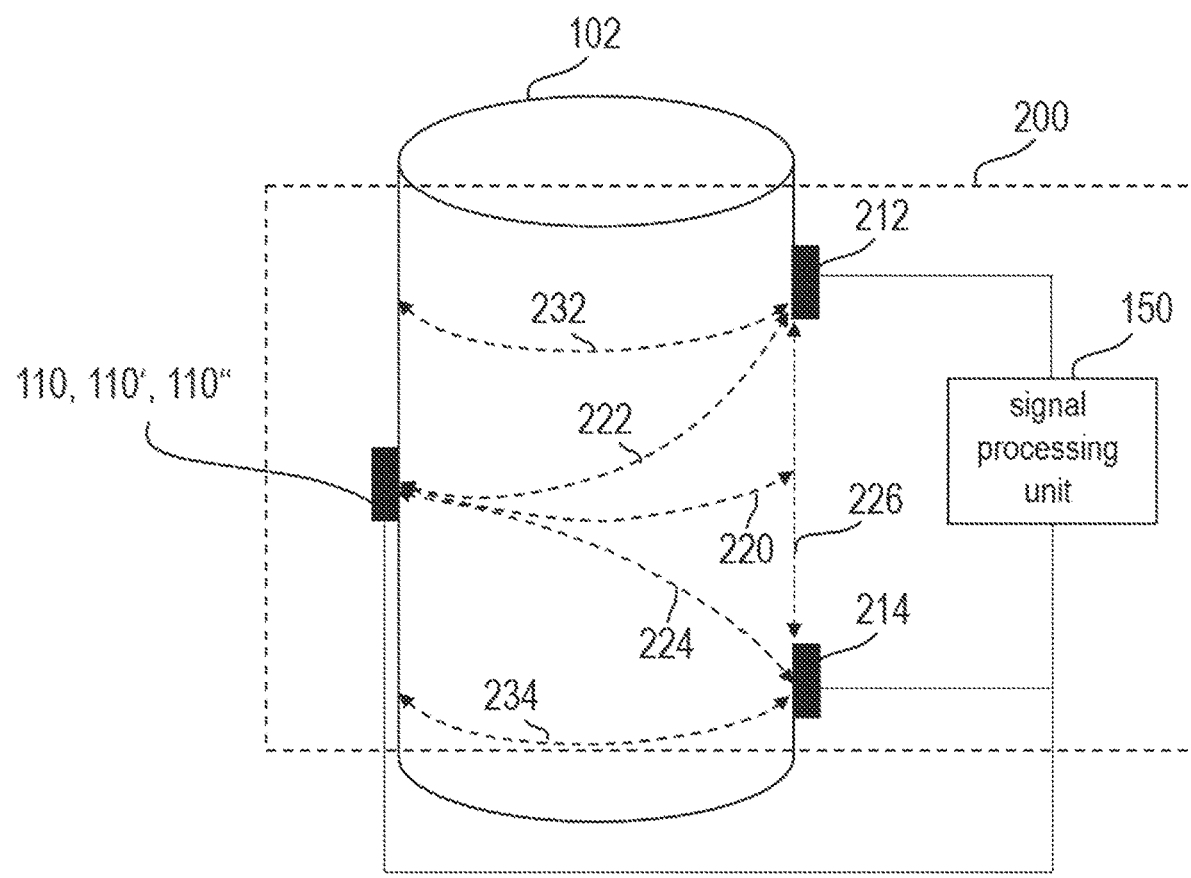
FIG. 2 shows a diagram of a second example of an integrity detection system.

FIG. 2 shows a diagram of a second example of an integrity detection system. In the shown example, the first transducer 110 and two further transducers 212, 214 are attached to the wall of the vessel 102. The first transducer 110 emits a first test signal to the further transducers 212, 214, and receives a second signal from each of the further transducers 212, 214, as indicated by arrows 222 and 224. Furthermore, the first transducer 110 emits the first signal to itself as indicated by arrow 220. Similarly, transducers 212 and 214 emit each a signal to themselves 232, 234, and to each other 226.

Figure 3:
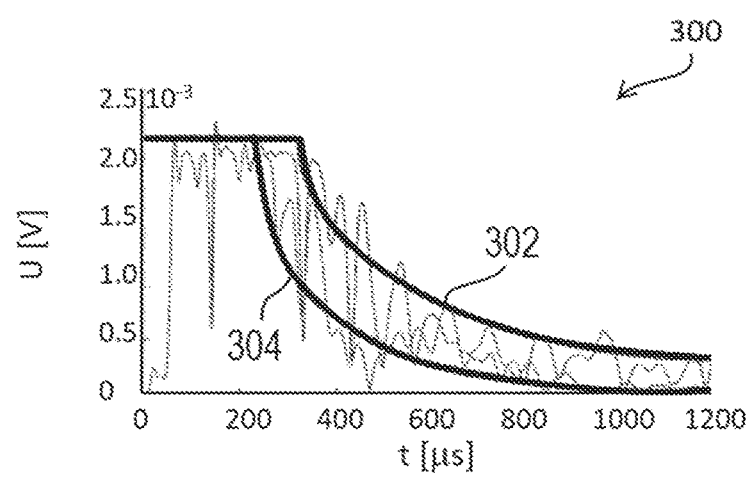
FIG. 3 shows a diagram of the ring down of the excitation signal.

FIG. 3 shows a diagram of the measured ring down of the signal of the excitation test signal. The thin lines show the envelope of the ultrasound signal obtained e.g. by applying a Hilbert transform and frequency filtering from the raw signal of the signal including the echo signal. The thick lines 302, 304 are a fit of an exponential decay of the envelope signal. The straight line at the beginning is caused by the saturation of the piezo during the excitation phase when a high initial voltage is applied to the piezo, or when the amplitude is still too high immediately after this phase. Line 304 is the result for a signal, when there is a good contact and the vessel wall is wet inside at the transducer position, whereas line 302 shows the case when there is no liquid in the vessel 102 at this position or there is no contact.

A decay constant of the exponential function may be determined representing the decay rate, which may be compared to pre-determined decay constants or decay rates, respectively, of the exponential functions when the wall inside the vessel is wet or dry, or when a contact between the piezo and the vessel wall is present or not.

Figure 4B:
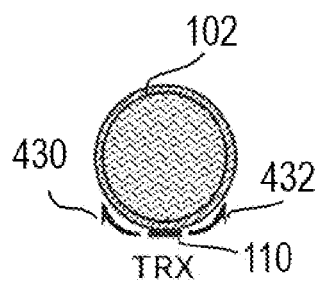
FIG. 4b shows a diagram of top view of a vessel with an attached transducer emitting a round trip signal.

FIG. 4a shows an exemplary diagram of an envelope of the received voltage u [mV] of round-trip signal versus time t [as], and FIG. 4b shows the top view of the corresponding arrangement with a transducer attached to a vessel 102. The test signal in FIG. 4a is an AO acoustic mode signal at an operation frequency of 380 kHz (a Lamb wave), which travelled around the vessel 102. FIG. 4b shows a top view on the vessel 102 and the emitting and receiving transducer 110. The arrows 430, and 432 indicate the path of the ultrasound test signal around the vessel. The first received peak 402 is the excitation signal including the echo signal echoed at the vessel wall immediately after emitting the signal. Peak 404 is the detected signal after running once around the vessel. Accordingly, peaks 206 and 208 are the peaks of the second and third arrival of the signal, e.g. due to round trips or reflections.

Figure 5:
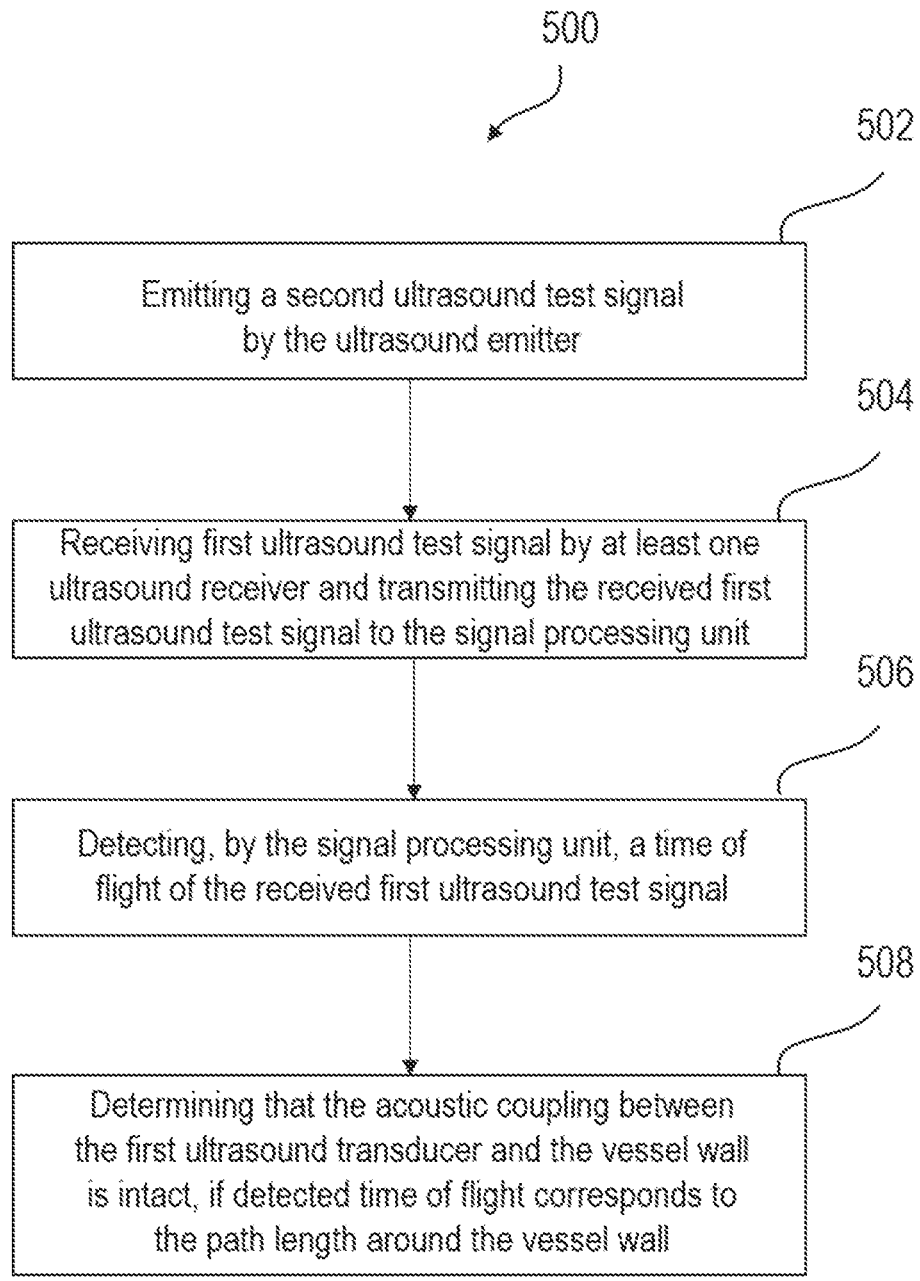
FIG. 5 shows a flow diagram of a method according to an embodiment.

FIG. 5 shows a flow diagram of a method according to an embodiment. The method 500 for detecting the integrity of the acoustic coupling of an ultrasound transducer at a wall of a vessel comprising the steps:

Emitting 502, by the ultrasound emitter, a second ultrasound test signal. Receiving 504, by at least one ultrasound receiver, the first ultrasound test signal, and transmitting the received first ultrasound test signal to the signal processing unit 150. Detecting 506, by the signal processing unit 150, a time of flight of the received first ultrasound test signal, and determining 508, by the signal processing unit, that the acoustic coupling between the first ultrasound transducer 110 and the wall of the vessel 102 of the ultrasound transducer is intact, if the detected time of flight corresponds to the length of the path 120 around the wall of the vessel 102.

FIG. 6 shows a further flow diagram 600 according to an example. After the start in 602, in a first step, a first test signal is emitted 604 by an ultrasound transducer 110. The first test signal may be the same test signal as described for FIG. 5, or a different signal. In 606, the first test signal is received as an excitation signal by the ultrasound transducer 110 and transmitted to a signal processing unit 150. In 608 the decay time of the received excitation signal is determined by the signal processing unit and analyzed with respect to the integrity of the acoustic coupling of the transducer. The analysis may comprise pre-processing the raw signal and an investigation of the delay time and characteristics of the waveform, which may be compared to stored waveform templates by subtraction or cross-correlation. If in 610 the result of the analysis is, that the acoustic coupling is intact, the signal processing unit sends 612 a corresponding indication to, e.g. a human-man interface or another interface, and the process is terminated 630. Otherwise, in 616, the above described method 500 is performed. If in 618 the result of the analysis is, that the acoustic coupling is intact, the signal processing unit sends in 620 an indication, that the coupling is all right and the process is terminated 630. Otherwise it is indicated 624 that the coupling is not intact, and the process is terminated 630.

In case of a proper acoustic contact and a wetted wall, a major portion of the acoustic energy is radiated into the medium contained by the vessel, which leads to a fast decay (acoustically terminated transducer). However, if the signal decay is closer to that of an unterminated transducer, it may be caused either due to a) the loss of acoustic contact or b) changes of the wetting of the wall (caused, e.g. by low level or partial filling).

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. An integrity detection system for detecting an integrity status of an acoustic coupling between an ultrasound transducer and a wall of a vessel, comprising:
    a signal processing unit configured to:
        cause a first ultrasound emitter, when attached to a wall of a vessel, to emit a first ultrasound test signal;
        receive, from at least one ultrasound receiver, when attached to the wall of the vessel, the first ultrasound test signal;
        detect a first time of flight of the received first ultrasound test signal; and
        determine that an acoustic coupling of the first ultrasound emitter and a first ultrasound receiver of the at least one ultrasound receiver to the wall of the vessel is intact if the detected first time of flight corresponds to a length of a path in the wall of the vessel from the first ultrasound emitter to the at least one ultrasound receiver; and
    a first ultrasound transducer configured to be attached to the wall of the vessel, the first ultrasound transducer comprising the first ultrasound emitter and the first ultrasound receiver,
    wherein the at least one ultrasound receiver is configured to be attached to the wall of the vessel,
    wherein one ultrasound receiver of the at least one ultrasound receiver is the first ultrasound receiver of the first ultrasound transducer,
    wherein the at least one ultrasound receiver is configured to receive an excitation signal of a first ultrasound test signal and to transmit the received excitation signal to the signal processing unit as a measured excitation signal,
    wherein the signal processing unit is configured to receive the excitation signal from the at least one ultrasound receiver, determine a decay time of the measured excitation signal, and determine that the acoustic coupling of the first ultrasound emitter and the at least one ultrasound receiver is intact if the decay time is less than a threshold, and
    wherein, if the signal processing unit has determined that the acoustic coupling of the first ultrasound emitter and the at least one ultrasound receiver is not intact, the signal processing unit is further configured to then detect the first time of flight and to determine that the acoustic coupling between the first ultrasound emitter and the wall of the vessel is intact based on the first time of flight.

2. The integrity detection system according to claim 1, further comprising a further ultrasound transducer,
    wherein the further ultrasound transducer is configured to emit a second ultrasound test signal in the wall of the vessel along a first path to the first ultrasound receiver and along a second path to the further ultrasound transducer,
    wherein the first ultrasound receiver and the further ultrasound transducer are further configured to receive the second ultrasound test signal and to transmit the received second ultrasound test signal to the signal processing unit, and
    wherein the signal processing unit is further configured to detect a second time of flight of the received second ultrasound test signal and to determine that the acoustic coupling of the first ultrasound transducer and the further ultrasound transducer is intact if the detected second time of flight corresponds to corresponding lengths of the first and the second paths of the received second ultrasound test signal.

3. The integrity detection system according to claim 1, wherein the excitation signal comprises a signal generated by an application of an excitation voltage of a piezo for the first ultrasound test signal.

4. The integrity detection system according to claim 1, wherein the measured excitation signal transmitted to the signal processing unit comprises a raw signal, and the signal processing unit is configured to pre-process the raw signal by applying a Hilbert transform and/or a frequency filtering.

5. The integrity detection system according to claim 4, wherein the signal processing unit is further configured to subtract the raw signal or the pre-processed raw signal from factory-calibrated waveform templates and/or to cross-correlate the raw signal with factory-calibrated waveform templates, and wherein the factory-calibrated waveform templates are representative of an acoustically terminated and an acoustically unterminated transducer.

6. The integrity detection system according to claim 1, wherein the threshold comprises a signal-to-noise-ratio or a value based on an output of an artificial intelligence algorithm or a pattern recognition algorithm.

7. The integrity detection system according to claim 5, wherein the signal processing unit is further configured to compare an amplitude, a power spectrum, a spectral phase, and/or a temporal phase of the received excitation signal with the factory-calibrated waveform templates.

8. A method for detecting an integrity status of an acoustic coupling between an ultrasound transducer and a wall of a vessel, the method comprising:
- emitting, by a first ultrasound emitter, a first ultrasound test signal, the first ultrasound emitter being attached to the wall of the vessel;
- receiving, by at least one ultrasound receiver, the first ultrasound test signal, the at least one ultrasound receiver being attached to the wall of the vessel, and transmitting the received first ultrasound test signal to a signal processing unit;
- detecting, by the signal processing unit, a first time of flight of the received first ultrasound test signal; and
- determining, by the signal processing unit, that the acoustic coupling of the first ultrasound emitter and the first ultrasound receiver of the at least one ultrasound receiver to the wall of the vessel is intact if the detected first time of flight corresponds to a length of a path in the wall of the vessel from the first ultrasound emitter to the at least one ultrasound receiver,
- wherein the ultrasound transducer is configured to be attached to the wall of the vessel, the ultrasound transducer comprising the first ultrasound emitter and the first ultrasound receiver,
- wherein one ultrasound receiver of the at least one ultrasound receiver is the first ultrasound receiver of the ultrasound transducer,
- wherein the at least one ultrasound receiver is configured to receive an excitation signal of a first ultrasound test signal and to transmit the received excitation signal to the signal processing unit as a measured excitation signal,
- wherein the signal processing unit is configured to receive the excitation signal from the at least one ultrasound receiver, determine a decay time of the measured excitation signal, and determine that the acoustic coupling of the first ultrasound emitter and the at least one ultrasound receiver is intact if the decay time is less than a threshold, and
- wherein, if the signal processing unit has determined that the acoustic coupling of the first ultrasound emitter and the at least one ultrasound receiver is not intact, the signal processing unit is further configured to then detect the first time of flight and to determine that the acoustic coupling between the first ultrasound emitter and the wall of the vessel is intact based on the first time of flight.

9. A program element comprising instructions, which causes the integrity detection system according to claim 1, when executed on a processor of the signal processing unit thereof, to execute a method for detecting an integrity status of an acoustic coupling between the ultrasound transducer and the wall of the vessel, the method comprising:
- emitting, by the first ultrasound emitter, the first ultrasound test signal, the first ultrasound emitter being attached to the wall of the vessel;
- receiving, by the at least one ultrasound receiver, the first ultrasound test signal, the at least one ultrasound receiver being attached to the wall of the vessel, and transmitting the received first ultrasound test signal to the signal processing unit;
- detecting, by the signal processing unit, the first time of flight of the received first ultrasound test signal; and
- determining, by the signal processing unit, that the acoustic coupling of the first ultrasound emitter and the first ultrasound receiver to the wall of the vessel is intact if the detected first time of flight corresponds to the length of the path in the wall of the vessel from the first ultrasound emitter to the at least one ultrasound receiver.

10. A computer readable medium on which the program element according to claim 9 is stored.

* * * * *